US008827864B2

(12) United States Patent
Durack

(10) Patent No.: US 8,827,864 B2
(45) Date of Patent: Sep. 9, 2014

(54) FULL TOROIDAL TRACTION DRIVE

(75) Inventor: Michael James Durack, Toowoomba South (AU)

(73) Assignee: Ultimate Transmissions Pty Ltd, Strathfield, NSW (AU)

( * ) Notice: Subject to any disclaimer, the term of this patent is extended or adjusted under 35 U.S.C. 154(b) by 162 days.

(21) Appl. No.: 13/500,856

(22) PCT Filed: Oct. 8, 2010

(86) PCT No.: PCT/AU2010/001331
§ 371 (c)(1),
(2), (4) Date: Apr. 6, 2012

(87) PCT Pub. No.: WO2011/041851
PCT Pub. Date: Apr. 14, 2011

(65) Prior Publication Data
US 2012/0202644 A1 Aug. 9, 2012

(30) Foreign Application Priority Data

Oct. 8, 2009 (AU) ................................ 2009904896

(51) Int. Cl.
*F16H 15/38* (2006.01)
(52) U.S. Cl.
CPC ..................................... *F16H 15/38* (2013.01)
USPC ............................................. 476/42; 476/40
(58) Field of Classification Search
CPC .. F16H 15/38; F16H 61/664; F16H 2015/383
USPC ..................................................... 476/40, 42
See application file for complete search history.

(56) References Cited

U.S. PATENT DOCUMENTS

| | | | |
|---|---|---|---|
| 2,130,314 A | 9/1938 | Brown | |
| 2,595,367 A | 5/1952 | Picanol | |
| 4,186,616 A | 2/1980 | Sharpe | |
| 4,392,973 A | 7/1983 | Moore et al. | |
| 4,934,206 A | 6/1990 | Nakano | |
| 5,048,359 A | 9/1991 | Nakano | |
| 5,111,710 A | 5/1992 | Perry | |
| 5,286,240 A * | 2/1994 | Kobayashi | 476/10 |
| 5,316,526 A * | 5/1994 | Fellows | 476/10 |
| 5,580,328 A * | 12/1996 | Aramaki | 476/40 |
| 5,676,618 A * | 10/1997 | Nakano et al. | 476/10 |

(Continued)

FOREIGN PATENT DOCUMENTS

FR 796188 A 3/1936

*Primary Examiner* — David M Fenstermacher
(74) *Attorney, Agent, or Firm* — Novak Druce Connolly Bove + Quigg LLP

(57) ABSTRACT

A toroidal variable speed traction drive includes a driving disc and a driven disc. The discs have a common axis. A plurality of pairs of contacting rollers are interposed between the discs. The discs are urged together against the roller pairs (A) by a clamping force. Each of the rollers has a first rolling surface, by which it rolls on the other roller of the pair, and a second rolling surface by which it rolls on the toroidal surface of a corresponding disc. Each roller is mounted on a supporting axle about which it can rotate. The rotational axes of the rollers in a pair are supported in a plane that contains the two points where the rollers of the pair contact the discs. At least one of the rollers in each pair is adapted to be moved to adopt a stable position within the plane by the reactionary force exerted on it by the other roller of the pair.

20 Claims, 4 Drawing Sheets

(56) References Cited

U.S. PATENT DOCUMENTS

| | | |
|---|---|---|
| 5,895,337 A | 4/1999 | Fellows et al. |
| 5,989,150 A | 11/1999 | Yamamoto |
| 6,716,135 B2 * | 4/2004 | Imanishi ........................ 476/40 |
| 7,014,588 B2 * | 3/2006 | Miyata et al. ................. 475/214 |
| 7,160,226 B2 | 1/2007 | Fuller |
| 7,211,024 B2 | 5/2007 | Taketsuna et al. |
| 2007/0204940 A1 | 9/2007 | Harada et al. |
| 2008/0254933 A1 | 10/2008 | Dutson |

* cited by examiner

FULL TOROIDAL TRACTION DRIVE

TECHNICAL FIELD

The present invention relates to Continuously Variable Transmissions, particularly of the Full Toroidal Race Rolling Traction Drive type.

BACKGROUND OF THE INVENTION

There are several Constantly Variable Transmissions (CVTs) that are being successfully designed and manufactured as transmissions for vehicles and other machines that require changing gear ratios.

The market for these drives within the automotive industry, at least, is generally split between belt drives and traction drives. The present invention is related to traction drives.

The traction drive market is dominated by two similar types of mechanism. One is generally called a Half Toroidal drive and the other a Full Toroidal drive.

Both of these involve the use of twin discs that are machined with the negative shape of a toroid in opposing faces. Between the discs are rollers that roll against the surface of both toroidal cavities and can transfer force and power from one disc to the other. Both of these drives use a special fluid called a traction fluid to allow a force transfer from the rollers to the discs without requiring metal to metal contact.

These rollers can be rotated so that they contact the discs in different places and in so doing can change gear ratio in a seamless manner as they move.

In a "Full Toroidal" drive the rollers centre of rotation is located on the centre of the toroidal cavity. In a "Half Toroidal" drive the rollers are located off the centre of the toroid towards the centre of rotation of the toroid.

Both types have advantages and disadvantages over each other and a tradeoff must be made in both cases using geometry to take advantage of the advantages and lessen the effects of the disadvantages.

An example of a typical Full Toroidal Variator is disclosed in U.S. Pat. No. 5,989,150, the disclosure of which is incorporated herein by way of reference. Two toroidal cavities are created between four discs which are clamped over rollers running on ball bearings and located generally in the centre of the toroidal cavity formed between the discs. The clamping system uses a roller cam arrangement located in the lower part of the diagram and a spring washer that provides a minimum clamp when no torque is being transferred or when changing from an acceleration mode to a deceleration mode. U.S. Pat. No. 5,111,710 discloses a typical toroidal cavity which contains three rollers.

An example of a Half Toroidal Variator is disclosed in U.S. Pat. No. 4,934,206. The disclosed Half Toroidal Variator exhibits the same twin cavity arrangement as in U.S. Pat. No. 5,989,150 and a similar clamping arrangement. U.S. Pat. No. 5,048,359 discloses a typical half toroidal cavity having three rollers mounted off-centre to the toroidal cavity.

It can be seen that in both cases a double toroidal cavity is used with each cavity typically containing three rollers. This configuration is adopted so that there is no need to support the clamping force on a rotating bearing. The clamping force is provided by the two outer toroidal discs which typically perform the function of the input. This necessitates the output being taken off via a secondary lay-shaft displaced from and running parallel to the main disc rotational axes.

Because the input and output in a typical single roller design rotate in opposite directions the differential speeds of the input and output are very great. The clamping force required to sustain the traction forces are also very high. Without the use of the double cavity the energy loss associated with supporting the rotational loads using bearings it considered too high by most designers.

The maximum practical number of rollers in the Half and Full Toroidal drives is three after which it becomes impossible to maintain sufficient ratio change. Typical ratio changes or ratio spread for both types is 6:1 although 7:1 is possible with the Full Toroid.

Considerable advances in the formulation of traction fluids have been made associated with the introduction of traction drives to the general market. They have unique property that causes them to increase in viscosity by billions of times when subjected to pressures of typically above 1 GPa and momentarily almost solidify when under high pressure. In a traction drive this solidification effect occurs as one surface rolls over the other and allows the forces to transfer from one mechanical part to the other through the fluid not via direct contact of the parts themselves, protecting the metal parts from damage. U.S. Pat. No. 4,392,973 describes a formulation for preparing a traction fluid using borate ester formulated in a particular way. The patent claims the use of the particular traction fluid in traction devices for transferring power.

Generally speaking the Full Toroid is simpler than the Half Toroid and has no heavily loaded thrust bearings, because most forces are balanced within the toroids themselves. It is also simpler to control and can employ what is referred to as torque control which is a very stable and reliable form of control. Torque control relies on balancing the reaction forces exerted by the rollers on a piston supplied with oil at a controlled pressure. The piston is arranged to move in a direction slightly off line to the plane of the discs called the "castor" angle and as it moves the roller which is connected to the piston via a ball joint is forced to steer to a new ratio in a controlled manner. Examples of such control are disclosed in U.S. Pat. Nos. 59,891,500, 7,160,226 and 4,186,616, the disclosures of which are herein incorporated by way of reference.

However the Full Toroidal Variator suffers from a mechanical problem called "spin". On the other hand the Half Toroid must deal with heavily loaded thrust bearings but does not suffer as much from "spin" and so the contact points can be larger, and when in one particular position can be designed to suffer no spin at all, where the surface velocities of the rollers and the toroidal discs almost perfectly match at the contacting points.

Considerable efforts have been made over the years to combine the control methods used in the Full Toroid with the low spin characteristics of the Half Toroid. U.S. Pat. No. 5,895,337 describes one such method.

"Spin" is a term often used when describing traction drives and refers to the spinning effect that happens when two surfaces roll over each other in such a way that the surface velocities do not exactly match each other. It can be likened to the "scrubbing" effect of a cylindrical roller continuously turning a corner.

In order to appreciate this problem refer to FIG. 1 which diagrammatically represents how these differential velocities come about. The variator main component parts consists of Input discs 100 and 101 driven by the input shaft 108.

Output discs 102 and 103. Rollers 106 supported on axles 104 running on bearings 105. A clamping plate 109 rigidly fixed to the shaft 108 and bears onto the upper disc 100 with hydraulic cylinders 107 to provide a clamping force. The disc 100 can move axially up and down on the shaft 108 but cannot rotate.

When the Variator is rotating it can be seen that the surface of the roller which is essentially cylindrical in shape will adopt a uniform speed across its width of R1×its angular velocity. However the corresponding speed on the input rollers will vary between R4×the input angular velocity and R5×the input angular velocity. The roller is forced to adopt a compromise speed somewhere between the two speeds on the discs. Only one infinitely narrow band of contact has equal velocity. A similar situation exists for the output contact patch because of a similar difference in velocities associated with the different radii R2 and R3. Nevertheless the variation in velocity of the contact surfaces can be maintained without damaging the metal parts because of the traction fluid's unique ability to shear without damage, up to a limiting speed (and pressure) where so much heat is developed that the traction fluid begins to break down or the hardened metal surfaces begin to anneal and soften.

When two surfaces roll over each other so that there is no difference in surface velocities then the traction fluid works well and can maintain quite high apparent traction coefficients of up to 0.1. When relatively high spin occurs the traction coefficient may maintain but a high degree of slip (loss of efficiency) occurs creating an "apparent" lowering of the traction coefficient. When the spin exceeds certain limits the high temperatures created under the patch will damage the traction fluid. These high temperatures can also affect the hardness of the steel limiting the types of steel and types of heat treatment process used to harden the components.

Many inventors have applied their talents to reducing the problems associated with overheating of contact patches including U.S. Pat. No. 7,211,024 that describes a method of spraying the roller with pre-cooled traction fluid, adopting mechanical enclosures to ensure the roller is washed in oil and using radiation to radiate heat away from the roller. US patent application publication no. 2007/0,204,940 describes a method of improving the properties, hardening methods, and surface treatment to enable the rollers to withstand higher temperatures. Attempts have also been made to reduce the overall size of the device by simplifying the method of roller control such as described in US patent application publication no. 2008/0,254,933.

The mechanical load transfer of a traction drive is completely different than the mechanical load transfer on friction gears such as railway wheels, where virtually no slip is allowed to occur as this would damage the wheels and rails. However prior to the advent of traction drives, made possible because of the development of traction fluids, there were many friction drives including Full and Half Toroidal Friction drives that utilized dry running friction to transfer power. Because of the spin problems described earlier associated with Full Toroidal Friction drives, although they could support high power and were relatively efficient, they were subject to fatigue and the moving parts needed replacement often. U.S. Pat. No. 2,595,367 (Picanol) proposed a method of at least partly solving this problem of fatigue, by replacing a single roller with double rollers, the disclosure of which is incorporated herein by way of reference.

The Picanol system does not appear to have been seriously implemented in any commercially available transmission. It is perceived that the Picanol system would suffer from mechanical difficulties associated with mounting of the rollers.

French patent no. 7961882 describes a method of applying a double roller concept to a Half Toroidal traction drive type.

The Picanol system was designed to solve a problem of fatigue that badly affected early friction drives. Its design appears to have been based on the fact that the coefficient of friction of dry steel on steel or steel running in a low viscosity oil is greater than 0.3. Although there are no calculations associated with the disclosure it can be understood by someone skilled in the art of traction drives that the clamping arrangement is very light and would not be capable of clamping sufficiently to enable an effective power transfer when using traction oil with a traction coefficient (friction coefficient) of around 0.05.

The Picanol system differed from the earlier French invention in that the rollers used two separate contacting surfaces. One to contact the toroidal disc and one to contact the other roller. The French patent used the Half Toroidal configuration described earlier while the Picanol patent used the Full Toroidal configuration.

The Picanol system arranged two rollers within the toroidal cavity in place of the single roller. By angling their rotational axes it was possible to closely match the surface velocities of the rollers and the discs and so avoid the problem of spin.

It is with the Full Toroidal Traction Drive concept that the present invention is specifically concerned. In this regard it is specifically concerned with the replacement of the Single Roller with a Double Roller.

The Picanol system was designed to solve a different problem than the current invention is concerned with. It set out to reduce the differential velocities of the contacting patches so that the friction drive or gears as they were referred to in 1947 were subject to less wear. Because the dry friction coefficient associated with Friction Drives is so much higher than the "wet" friction associated with Traction Drives the clamping forces applied in the Picanol system were small and the associated support systems light.

A typical Full Toroidal Variator can absorb 10-20 Nm of torque per liter of mechanical volume. The Picanol system appears to be designed to absorb a similar level when running as a friction drive but if running in a traction fluid could absorb only 25% of this.

The double roller as described in Picanol did describe a way in which the durability of a full toroidal variable friction gear may be improved however it did not describe a way in which the more modern traction drive running in traction fluid could be improved in power density. If such a drive was converted to a traction drive, problems would be encountered with most of its mechanical arrangement if any attempt to increase the power density beyond the current level.

Picanol required that the rollers be supported on a single "V" shaped rigid dual axle support. This support confirmed that the rotational axes of the rollers were set at the angles that ensured that the surface speeds between discs and rollers at the contact points remained as similar as possible.

In order to increase power densities of a traction drive where the frictional coefficient or more appropriately the traction coefficient is typically only 20% of the dry friction coefficient, it is necessary to increase the clamping force by several times. Without such increases the double roller design will remain less power dense than the much simpler single roller design.

When the clamping pressures are increased the roller support mechanism involving two connected axles described in Picanol become unworkable.

When the conical sections of the rollers are subject to pressure on their mating surfaces very small deflections occur. The size of these deflections varies with how much of the load they are carrying and the variable radii of the cones themselves and the structure of the rollers themselves. When heavily clamped, the rollers will attempt to adopt positions where the included angle of their rotational axes is not exactly equal to the unloaded included angle between the cones. In a working mechanism this will load up the supporting bearings which will attempt to resist the deflected position. When the clamping forces are high and the width of the conical contacts large in proportion, this will at best lose efficiency and at worst very rapidly collapse the bearings.

Similarly the deflection on the conical roller surfaces will reduce the distance between the roller axles. Unless the "V" shaped connected axles can displace themselves laterally within the plane that contains them this will load up the bearings and inhibit the force carried by the conical surfaces necessary to transfer load, or damage the bearings, or bend the axles.

It may be possible to design a way around this by carefully studying the true angle of the clamped cones and adjusting the angle included by the supporting axles accordingly. However in modern traction drives the clamping force is typically adjusted up and down dependant on how much power or torque is passing through the machine. Any fixed angle will immediately only work in one clamping state. In other positions the same problem will exist.

It is an object of the present invention to adopt the double roller design of Picanol for use in a traction drive having developments which eliminate the roller support problems present in Picanol. Further, such a double roller design can exhibit much higher power densities than a Single Roller Full Toroidal Drive, and can be controlled in a manner similar to modern control philosophy and with durability expectations consistent with modern traction drives.

SUMMARY OF THE INVENTION

According to the present invention there is provided a toroidal variable speed traction drive comprising a driving disc and a driven disc, said discs having a common axis; a plurality of pairs of contacting rollers interposed between said discs; the discs are urged together against the roller pairs by a clamping force; each of the rollers having a first rolling surface by which it rolls on the other roller of the pair, and a second rolling surface by which it rolls on the toroidal surface of a corresponding disc; each roller is mounted on a supporting axle about which it can rotate; the rotational axes of the rollers in a pair are supported in a plane that contains the two points where the rollers of the pair contact the discs; at least one of the rollers in each pair is adapted to be moved to adopt a stable position within said plane by the reactionary force exerted on it by the other roller of the pair.

Preferably, the first rolling surface is substantially conical. The angle of the conical surfaces of the rollers in a pair can be such that the rotational axes of the rollers adopt a position in which the surface velocities of the contacting points of the rollers and discs substantially match each other for at least one rotational position of the roller pair.

In preferred embodiments, each roller pair is mounted in a respective trunnion support having a pair of supporting axles. The trunnion support can be rotatable, the centre of rotation of which lies in a plane that is parallel to the rotational plane of the discs, and is tangential to the centre of the toroidal cavity defined by the toroidal surfaces of the discs. The discs can move in a direction parallel to the common axis towards or away from the centre of rotation of the trunnion supports under the influence of the clamping force. At least one of the supporting axles in the trunnion support can be mounted in the trunnion support in a slidable support that allows the axle to move within a plane that contains the two points where the roller pairs contact the discs.

In exemplary embodiments, the variable speed drive is lubricated with a traction fluid that increases its viscosity when under pressure and the surface of the rollers and discs are arranged such that no metal to metal contact occurs between the rollers and the discs when operating at speeds greater than 500 rpm.

In preferred embodiments, the variable speed drive is lubricated with a traction fluid that exhibits a traction coefficient of greater than 0.05 when subject to a stress of greater than 1 GPa.

Preferably, the second rolling surface is a toroidal surface.

BRIEF DESCRIPTION OF THE DRAWINGS

A preferred embodiment of the invention will now be described with reference to the drawings in which.

DETAILED DESCRIPTION OF THE INVENTION

A first aim of the invention is to reduce the differential velocities that exist between the rollers and the discs to almost zero in at least one ratio position.

Figure 1:
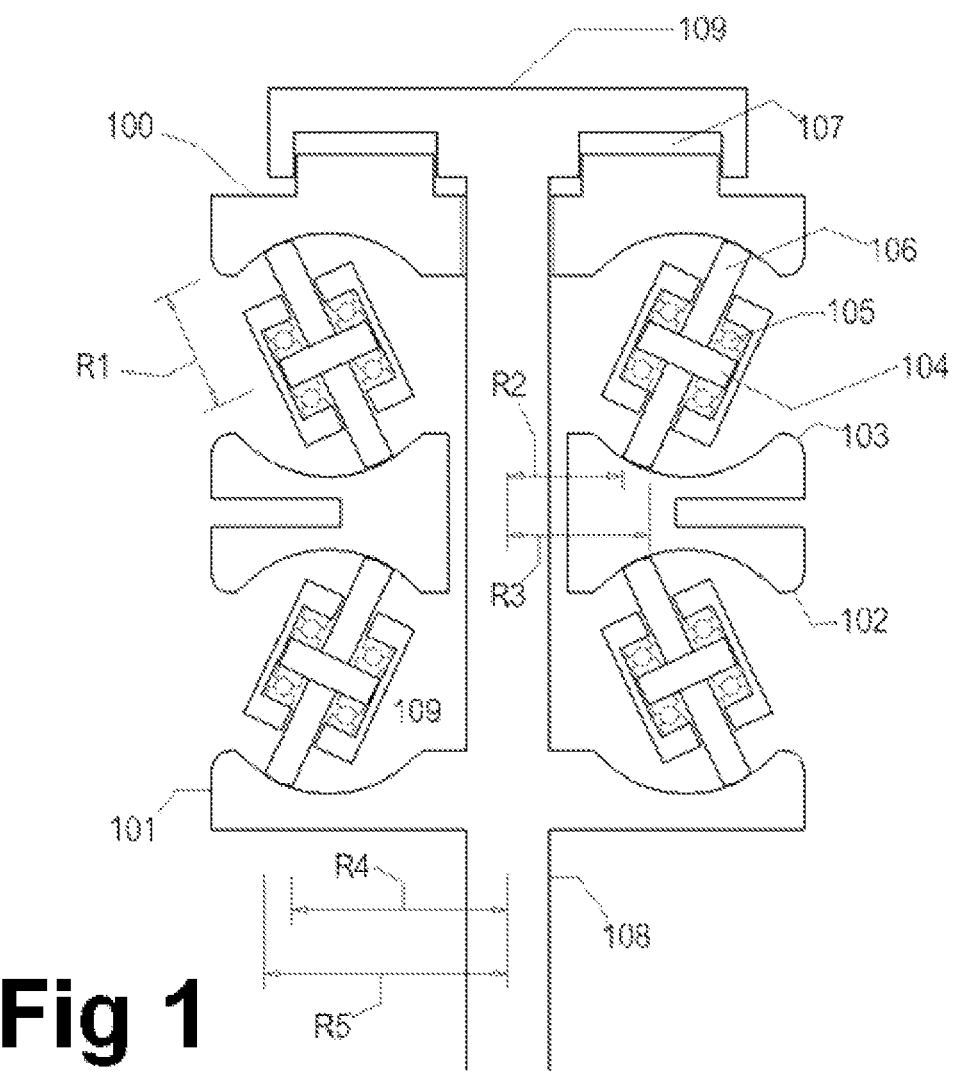
FIG. 1 shows a schematic illustration of a prior art single roller design of a Full Toroidal traction drive.
Figure 2:
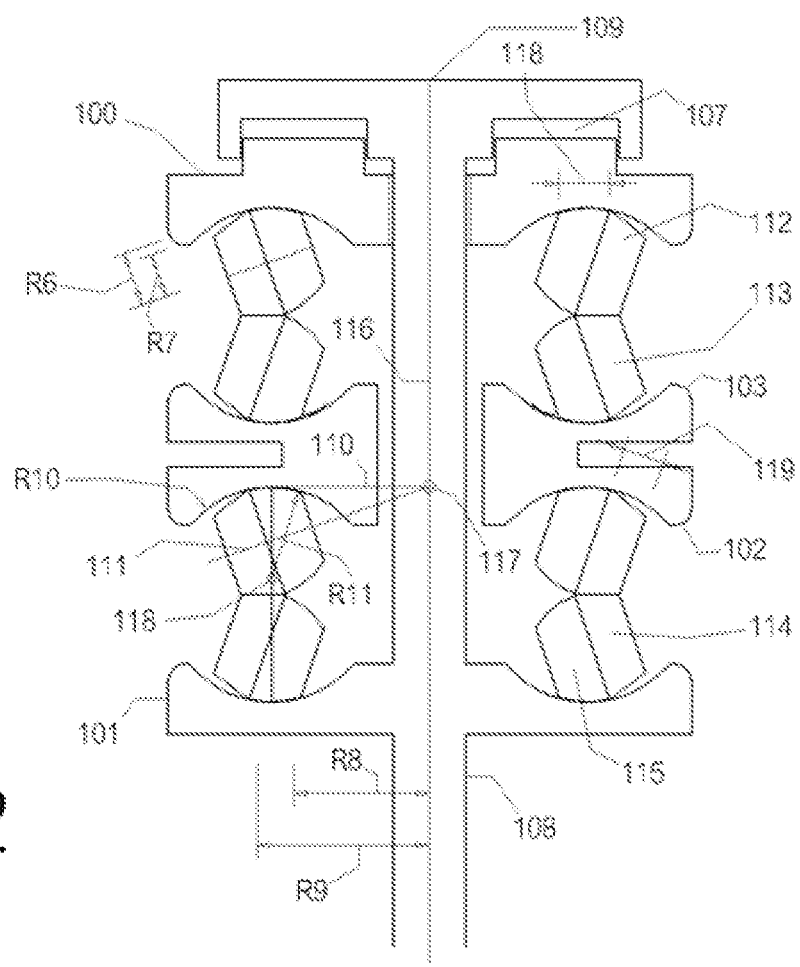
FIG. 2 is a schematic illustration of a double roller design according to a preferred embodiment of the invention.

In order to achieve the first aim, a Full Toroidal Variator that includes the input and output discs shafts bearings and clamping device is selected. FIG. 2 shows diagrammatically such an arrangement. Two rollers 112 and 113 replace the conventional single rollers. These rollers are made with a generally conical rolling surface 114 on which they roll on each other and a generally toroidal surface 115 on which they roll on the discs.

The conical surface could also be formed with a very large crown radius or with curved edges so as to reduce stress concentrations at the edges of the conical surfaces. This modification is often associated with the design of fixed ratio traction drives involving cylinders or cones. Although not exactly conical the surfaces will control the actual angle adopted by the rollers relative to each other, allowing some small variations associated with misalignment of actual load paths.

The angle of the cone and associated roller mounting is arranged so that when clamped together by the discs, the rotational axes of the rollers 111 lie within a plane that passes through the common axis, are displaced from each other under the influence only of the conical surfaces and the clamping reactions, but run through the common rotational axis of the discs 116. The degree of displacement is such that in at least one position, each roller (not necessarily simultaneously) experiences a state where the differential velocities across the contacting surfaces is less than 0.5% and where the tangent of the disc and roller surface 110 at the centre of the point of contact, and the roller rotational axis 111, and the disc rotational axis 116 generally pass through the same point 117.

When the discs are clamped together by the hydraulic pistons 107 a contact patch develops according to the laws governing Hertzian contacts. Between one deformed metallic surface and the other a layer of traction fluid forms that has properties similar to a solid with a solid like relatively high shear strength. The film of fluid has a measurable thickness less than 0.01 mm. The result is that one surface causes the other surface to move via this solidified film of fluid. The relative rate of movement is related to the properties of the fluid, and the force being transferred, and the force being supported by the patch. It is not directly related to the size of the patch. The size of the patch determines the allowable force within the stress limits of the roller and disc materials. Generally these fluids can allow a transfer of at least 90% but preferably more than 97% of the velocities when the force being transferred is less than 10% of the force being supported by the patch, but preferably between 5% and 10% of the force being transferred.

The width of this contact point, that is across the rolling surface, and the length, that is in the rolling direction (smaller than width), is governed by:

1) the Young's modulus of the material,
2) Poisson's Ratio for the material,
3) the toroidal radius of the roller (R11 in FIG. 2),
4) the toroidal radius of the disc (R10 in FIG. 2),
5) the radius of the roller at the point of contact,
6) the radius of the disc at the point of contact,
7) the laws of physics that control the stress distribution in a contact (Hertzian) of this type,
8) the clamping force,
9) the number of roller pairs in one cavity,
10) the angle of rotation (ratio) of the roller pairs.

Adoption of these specific and very real numbers and formulae will define the contact patch dimensions.

The "width" dimension will define the radii R6, R7, R8 and R9 from FIG. 2 and in turn will determine the degree of spin. In determining the radius of the roller and the radius of the disc at the point of contact it is necessary to look much further than the actual radius.

Figure 3:
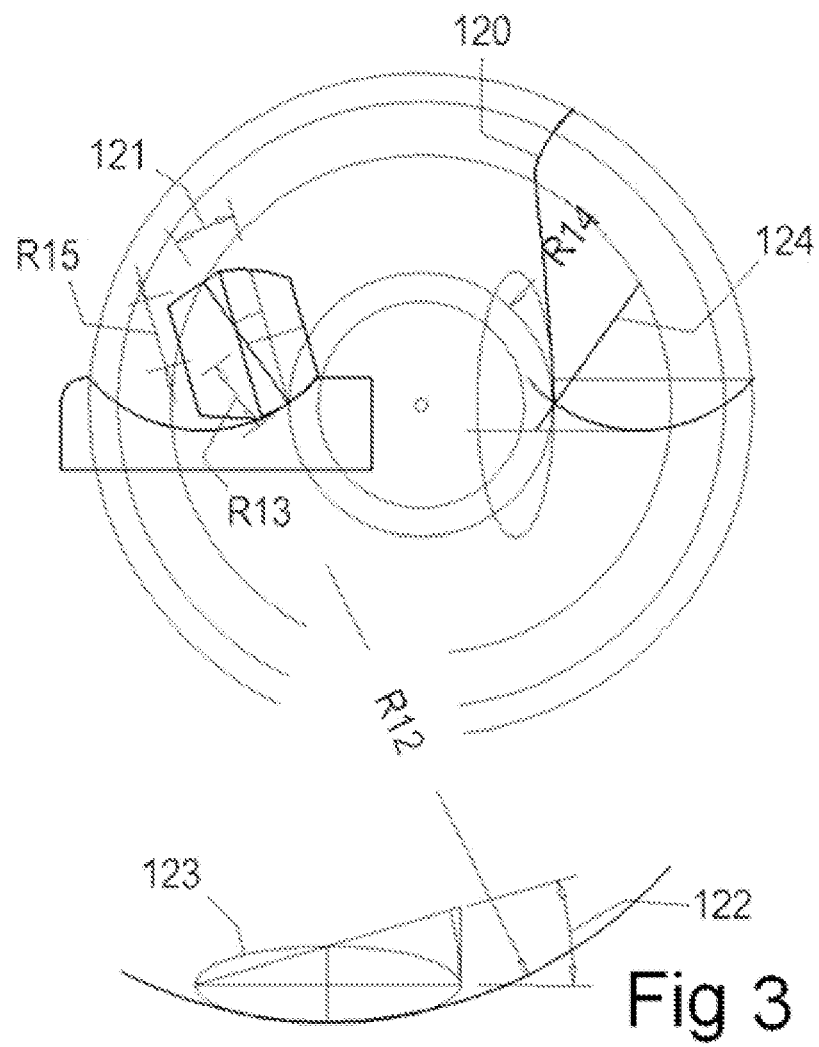
FIG. 3 illustrates the contact areas between roller and disc from the design of FIG. 2.

FIG. 3 represents diagrammatically how to develop an approximation of these radii R13 and R12 by representing the actual circles R14 and R15 of contact circles as an ellipse viewed at the angle 122 of inclination of the plane 124 that lies within the line of the two contacts tangential to the circle of contact R14 cutting the toroidal surface along the line 120 and the angle of inclination of the rollers 121.

The most heavily loaded point and the point at which the ultimate maximum input torque is experienced is in extreme low ratio position. In this position the disc radius is at its smallest, the effect of differential velocities at its worst and the lever-arm necessary to support a torque input at its smallest, for both mechanisms.

The reduction in size of the rollers allow more roller pairs to be fitted into the same toroidal cavity. From two to as many as eight are possible with preferably three to six being adopted in most practical designs.

In order to move the double rollers into different positions for changing the ratio a rotational force is applied to the mounting trunnion of the rollers that is sufficient to cause the contact points to progressively slide sideways within the toroidal cavity. This is somewhat contrary to the current notion that rollers within Full Toroidal Variators must be steered into new ratios by displacing their rotational axes off the common axis of the discs. This was certainly the case for the Picanol design because the device used dry friction to transfer power. The use of traction fluid and its unique ability to allow a degree of slide under even a small force without damage allows a directly rotated arrangement to be used.

In order to create a greater rate of slip or creep it can be possible to reduce the clamping force during a ratio change so that the rate of slip increases without allowing the rollers to fall into a state of gross slip that could cause damage. This clamping force adjustment could be achieved using electronics or a feedback from 10 the comparison of the rate of ratio change to the force being applied.

It is also possible to mount the rollers in such a way that when the trunnion is rotated the rollers are displaced so that their rotational axes no longer pass through the common axis, and they steer to a new ratio position reducing the required rotational torque on the trunnion.

When power is being passed through a double roller system a torque reaction force is applied to each roller in different direction. The torque reaction forces are created as force is transferred from the disc to the roller and from roller to disc, and also at the contact of roller to roller. These forces are typically 10% to 16% of the clamping force and must be resisted by the bearings and axles that pass through the rollers. The torque reaction forces act in a direction that generally lies in a plane that is parallel to the rotational plane of the discs and at right angles to the line connecting the two contact points of the rollers with the discs.

These reaction forces must be fully supported in the direction in which they act and in a way that allows freedom of movement of the rollers in other directions. If the rollers and or the discs cannot move slightly in the direction of the clamping forces then the supporting axles and bearings will "load up" with part or all of the clamping force, as deflections occur in the system.

The torque reaction forces acting on the rollers act in opposite directions for each roller. This means that there are no unbalanced forces in a direction tangential to the centre of the toroidal discs. However if the rollers are supported in this direction by a trunnion support there is a substantial rotational moment transferred to that support.

It is a second aim of this invention to develop a way of supporting the rollers within the toroidal cavity so that the torque reaction forces are adequately supported while allowing the clamping forces to be supported only on the rollers and discs and in a way that leaves the rollers axis of rotation aligned so as to reduce or eliminate the differential velocities of the contacts of the rollers with the discs for at least one ratio position.

This second aim is achieved by:

1) providing roller support axles and associated bearings that are rigidly supported in a plane that includes the line connecting the points where the rollers contact the discs,
2) Providing a support trunnion that collects and resists the rotational forces from these axles so that this line remains substantially within a plane that includes the common axis,
3) Allowing at least one of the axles in each pair to move freely within the plane in which it is supported.

Figure 4:
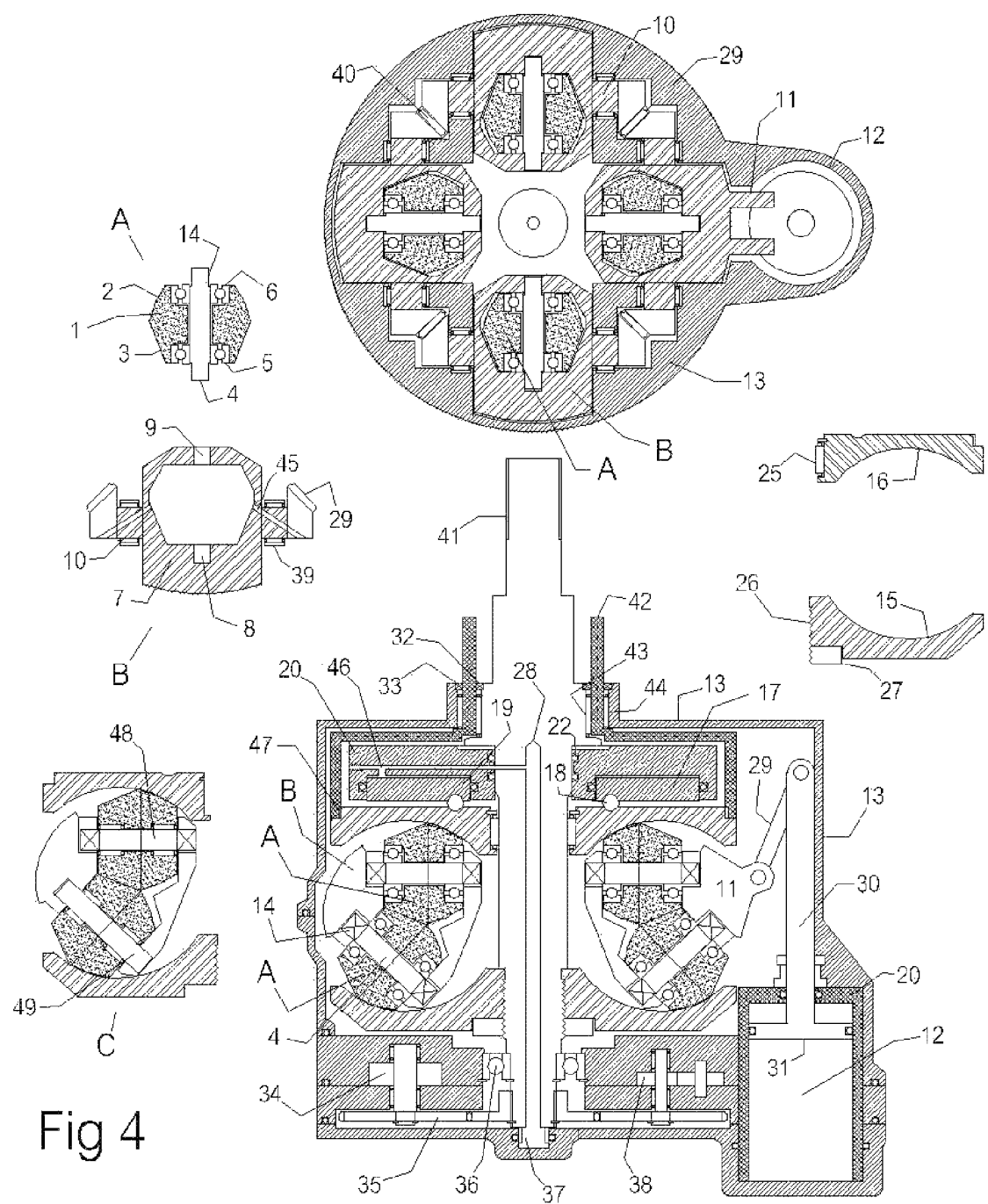
FIG. 4 shows a number of views of a Full Toroidal traction drive according to a preferred embodiment of the invention.

A preferred embodiment of the invention is shown in FIG. 4.

Four sets of double rollers A are supported in four trunnions B and arranged in a housing 13. The rollers are supported on axles 4 that have flattened ends 14 that slide into slots 8 and 9 in the trunnion bodies.

The rollers are fitted with deep groove ball bearings 5 and 6 that slide over the axles and fit with a very small clearance into the space within the trunnion between the slots. Each roller can thus move up and down within the trunnion and to a limited extent, rotate. This ensures that the position and angle, at least within the plane containing the common axis and the centre of the roller contact point adopted by each roller is created only by the conical surfaces on the rollers, the toroidal surface of the discs and the clamping force.

It can also be seen that one of the axles could be fixed with only one floating, and the same result could be achieved provided the trunnions or discs were free to move in the direction of the main rotational axes. Assembly C shows such an arrangement with the axle 48 being free to move within the trunnion within slotted holes and axle 49 fixed into the trunnion in circular holes. When the trunnions rotate the fixed axle forces the lower roller to move which in turn forces the upper roller to follow via forces exerted on the conical surfaces.

The trunnions B are fitted into the body 13 on short axles 10 mounted on needle roller bearings 39. The end of the axle is fitted with a section of spur gear 29 that engages with the adjacent trunnion at point 40 so that all trunnions are forced to rotate synchronously.

One of the trunnions is fitted with a clevis 11 that connects via a conrod arm 29 to a piston rod 30 which is moved up and down by the pressure in a cylinder 12 acting against a piston 31 located in a cylinder.

The rollers are clamped between two toroidal discs 15 and 16. Disc 15 is driven by the input shaft 41 supported on a screw thread 26 locked to the shaft by lock nut 27. Disc 16 runs on bearings 25 against the input shaft and outputs to a bell shaped output body 42 that fits over the output disc on splines 47. The hollow output shaft runs on bearings 43 and 44 and is provided with seals 33 and 32 to contain the traction fluid.

The input shaft 41 is fitted with a clamping plate 20 that collects high pressure fluid via a gallery 28 bored through it. An annular gallery is formed in the clamping plate into which fits an annular piston 19 that bears onto a bearing set 18 placed between it and the disc 16. Preferably adjusting the pressure of the fluid keeps the correct clamping pressure on the roller pairs.

The input shaft 41 is mounted at the opposite end to the input, in a bearing 36. The shaft drives a series of gears 35 connected to hydraulic pumps two of which are 34 and 38. One of these pumps provides low pressure oil for lubrication via galleries in the trunnions 45 that direct oil onto the rollers. A second pump provides oil for the clamping system. A third pump provides oil to the actuator. Oil required for clamping passes up from a seal 37 via a gallery 28 drilled in the input shaft and then via a seal 22 to gallery 46 drilled in the clamping plate 17.

The control system is provided with electronic signals that represent a measure of the input torque and the position of the input roller with respect to the common axis of the discs. Using these two numbers the required clamping force is calculated and converted to pressure. Electronic pressure control fitted to one of the pumps provides the required clamping pressure. This pressure can be further modulated according to the type of traction fluid, the temperature of the fluid, the angular rotation of the rollers, and the degree of "spin" estimated to be occurring at the contact patches.

When the control system demands a ratio change in the CVT it will provide pressurized oil to one or other side of piston 31 causing the actuator to move to a prearranged position where it will then stop.

The speed of movement of the roller pair will be governed by the force applied by the piston and the operating traction coefficient during the ratio change. To a certain extent it is affected by the degree of "spin" operating during a ratio change.

During normal operation the control system can use a traction coefficient that will maintain the slide roll ratio below an acceptable limit. However during a ratio change the traction coefficient being used to calculate the required clamping pressure can be raised allowing the slide roll ratio of around 1% to increase to 3%-4%. This will significantly lower the required force and or speed up the rate of ratio change.

The actuator proposed is hydraulic although it can readily be seen that an electronic form of actuator would also be suitable for this type of control. It also can readily be seen that other methods of achieving the same result can be applied including but not limited to a different control system and hydraulic arrangement. A manual control is also possible.

it can readily be seen that this arrangement can also incorporate the double cavity design often adopted for Full and half Toroidal designs eliminating the need for thrust bearings.

It will be found that the number of roller sets can range from two to eight as the arrangement is fundamentally very compact.

The clamping force could be arranged to be a constant applied by a spring or variable using a ramped loading device that increases as either input torque or output torque is varied.

It can readily be seen that other embodiments of this invention could be designed by someone skilled in the art of variable ratio traction drives including methods of steering the rollers so as to avoid the large force required to move them without such steering arrangement.

The claims defining the invention are as follows:

1. A toroidal variable speed traction drive comprising a driving disc and a driven disc, said discs having a common axis; a plurality of pairs of contacting rollers interposed between said discs; the discs are urged together against the roller pairs by a clamping force; each of the rollers having a first rolling surface by which it rolls on the other roller of the pair, and a second rolling surface by which it rolls on the toroidal surface of a corresponding disc; each roller is mounted on a supporting axle about which it can rotate; the rotational axes of the rollers in a pair are supported in a plane or planes that contain the two points where the rollers of the pair contact the discs; at least one of the rollers in each pair is adapted to be moved to adopt a stable position within said plane by the reactionary force exerted on it by the other roller of the pair.

2. The toroidal variable speed traction drive according to claim 1, wherein said first rolling surface is substantially conical.

3. The toroidal variable speed traction drive according to claim 2, wherein the angle of the conical surfaces of the rollers in a pair is such that the rotational axes of the rollers adopt a position in which the surface velocities of the contacting points of the rollers and discs substantially match each other for at least one rotational position of the roller pair.

4. The toroidal variable speed traction drive according to claim 1, wherein each roller pair is mounted in a respective trunnion support having a pair of supporting axles.

5. The toroidal variable speed traction drive according to claim 4, wherein said trunnion support is rotatable, the centre of rotation of which lies in a plane that is parallel to the rotational plane of the discs, and is tangential to the centre of the toroidal cavity defined by the toroidal surfaces of the discs.

6. The toroidal variable speed traction drive according to claim 5, wherein the discs can move in a direction parallel to the common axis towards or away from the centre of rotation of the trunnion supports under the influence of the clamping force.

7. The toroidal variable speed traction drive according to claim 4, wherein at least one of the supporting axles in the trunnion support is mounted in the trunnion support in a slidable support that allows the axle to move within a plane or planes that contains the two points where the roller pairs contact the discs.

8. The toroidal variable speed traction drive according to claim 1, wherein the variable speed drive is lubricated with a traction fluid that increases its viscosity when under pressure and the surface of the rollers and discs are arranged such that no metal to metal contact occurs between the rollers and the discs when operating at speeds greater than 500 rpm.

9. The toroidal variable speed traction drive according to claim 1, wherein the variable speed drive is lubricated with a traction fluid that exhibits a traction coefficient of greater than 0.05 when subject to a stress of greater than 1 GPa.

10. The toroidal variable speed traction drive according to claim 1, wherein the second rolling surface is a toroidal surface.

11. A toroidal variable speed traction drive comprising:
a driving disc;
a driven disc; and
a plurality of pairs of contacting rollers interposed between the driving disc and the driven disc,
wherein the driving disc and the driven disc have a common axis,
wherein the driving disc and the driven disc are urged together against the plurality of contacting roller pairs by a clamping force,
wherein each of the plurality of pairs of contacting rollers comprises a first roller and a second roller,
wherein each first roller comprises a first rolling surface and a second rolling surface,
wherein each second roller comprises a third rolling surface and a fourth rolling surface,
wherein the first rolling surface rolls on the third rolling surface,
wherein the second rolling surface rolls on a first toroidal surface of the driving disc at a first point,
wherein the fourth rolling surface rolls on a second toroidal surface of the driven disc at a second point,
wherein each roller of the plurality of pairs of contacting rollers is mounted on a supporting axle about which the roller is adapted to rotate;
wherein each first roller has a first rotational axis about which it rotates,
wherein each second roller has a second rotational axis about which it rotates,
wherein the first rotational axis and the second rotational axis are supported in at least one plane,
wherein the at least one plane comprises the first point and the second point,
wherein each of the plurality of pairs of contacting rollers comprises at least one stabilized roller,
wherein the at least one stabilized roller is selected from the group consisting of the first roller and the second roller, and
wherein the at least one stabilized roller is adapted to be moved to adopt a stable position within the at least one plane by a reactionary force exerted one selected from the group consisting of the first roller and the second roller.

12. The toroidal variable speed traction drive according to claim 11, wherein one selected from the group consisting of the first rolling surface, the third rolling surface, and combinations thereof is substantially conical.

13. The toroidal variable speed traction drive according to claim 12, wherein the first rolling surface is substantially conical, such that the first rolling surface is inclined at a first angle relative to the first rotational axis,
wherein the third rolling surface is substantially conical, such that the third rolling surface is inclined at a second angle relative to the second rotational axis,
wherein the first angle and the second angle are selected such that the first rotational axis and the second rotational axis adopt positions in which a first surface velocity of the second rolling surface at the first point is substantially equal to a second surface velocity of the fourth rolling surface at the second point, for at least one rotational position of each of the plurality of pairs of contacting rollers.

14. The toroidal variable speed traction drive according to claim 11, wherein each of the plurality of pairs of contacting rollers is mounted in a respective trunnion support having a pair of supporting axles.

15. The toroidal variable speed traction drive according to claim 14, wherein the trunnion support is rotatable,
wherein a center of rotation of the trunnion support lies in a plane that is parallel to a rotational plane of the driving disc and the driven disc, and is tangential to a center of a toroidal cavity defined by the first toroidal surface and the second toroidal surface.

16. The toroidal variable speed traction drive according to claim 15, wherein the driven disc and the driving disc is adapted to move in a direction parallel to the common axis under the influence of the clamping force.

17. The toroidal variable speed traction drive according to claim 14, wherein at least one of the supporting axles in the trunnion support is mounted in the trunnion support in a slidable support adapted to allow the axle to move within at least one plane containing the first point and the second point.

18. The toroidal variable speed traction drive according to claim 11, wherein the variable speed drive is lubricated with a traction fluid that increases its viscosity when under pressure and the surface of the rollers and discs are arranged such that no metal to metal contact occurs between the rollers and the driven disc and the driving disc when operating at speeds greater than 500 rpm.

19. The toroidal variable speed traction drive according to claim 11, wherein the toroidal variable speed drive is lubricated with a traction fluid that exhibits a traction coefficient of greater than 0.05 when subject to a stress of greater than 1 GPa.

20. The toroidal variable speed traction drive according to claim 11, wherein at least one selected from the group consisting of the second rolling surface and the fourth rolling surface is a toroidal surface.

* * * * *